United States Patent [19]
Miroshnikov et al.

[11] 3,886,362
[45] May 27, 1975

[54] METHOD AND APPARATUS FOR THERMAL EXAMINATION OF THE INTERIOR SURFACE OF ANNULAR STATOR PACKS FOR ELECTRICAL MACHINES

[76] Inventors: Mikhail Mikhailovich Miroshnikov, Ulita Kartashikhina, 31, kv. 65; Evgeny Nikolaevich Mineev, ulitsa Matrosa Zheleznyaka, 19, kv. 4; Konrad Saakovich Karapetian, Krasnaya ulitsa, 53, kv. 5; Roza Nikolaevna Ivanova, ulitsa Grota, 1/3, kv. 5; Vasily Vasilievich Romanov, Naberezhnaya Chernoi rachki, 18, kv. 30; Sergei Nikolaevich Kurnakov, ulitsa Aviatsionnaya 13, kv. 91; Garri Mikhailovich Khutoretsky, Alataiskaya ulitsa, 20, kv. 5; Ivan Ivanovich Elin, Derptsky pereulok, 11, kv. 16; Valentin Mikhailovich Bykov, ulitsa Matrosa Zheleznyaka, 19, kv. 45; Dmitry Dmitrievich Valchikhin, 10 Linia, 29 kv. 6, all of Leningrad, U.S.S.R.

[22] Filed: Apr. 9, 1973

[21] Appl. No.: 349,665

[52] U.S. Cl. .............. 250/340; 250/341; 250/347; 250/360; 73/355 R
[51] Int. Cl. ............................................. G01t 1/16
[58] Field of Search .......... 250/347, 353, 338, 340, 250/341, 360; 73/350, 351, 355 R

[56]         References Cited
         UNITED STATES PATENTS
3,501,380  3/1970  Perch .............................. 73/355 R Primary Examiner—James W. Lawrence
Assistant Examiner—Davis L. Willis

[57]            ABSTRACT

A method for investigating the quality of active-steel stator packs for an electric machine in which an infrared heat sensor is introduced into the bore of a stator to carry out continuous measurement of the entire inner surface of the stator, the result being obtained in the form of an infrared chart made to scale, the contrast areas of the chart serving to determine the coordinates and shape of the excess-heating zones in the active steel of the stator.

10 Claims, 5 Drawing Figures

3,886,362

METHOD AND APPARATUS FOR THERMAL EXAMINATION OF THE INTERIOR SURFACE OF ANNULAR STATOR PACKS FOR ELECTRICAL MACHINES

The present invention relates to quality control methods for stators of large electric machines, such as turbogenerators. The quality control of active-steel stator packs of electric machines is a vital problem to be solved in current power industries, for it determines, in the long run, the reliability of an electric machine. A poorly performed assembly of active-steel stator packs results in serious overheating of portions of the stator, which may put the electric machine out of action.

At present, the quality control of active-steel stator packs is performed by induction heating of the steel mass by means of an auxiliary winding, after which the temperature of the steel mass surface is measured by means of thermocouples pressed tightly against the stator surface or inserted into a space between the sheets.

In this way, the temperature at different points of the stator is measured, and the quality of the active-steel stator packs is judged from the difference between the maximum and minimum values of temperature at those points.

The above method fails to present a complete picture of thermal radiation over the entire inner surface of a stator, which will be hereafter referred to as the stator thermal field, and provides continuous data only for a very small number of points comprising no more than 0.5 to 1.5 per cent of the number of serration heads which can be regarded as stator surface elements possessing maximum uniformity with respect to thermal characteristics. Statistical reliability of such quality control is meager. An increase in the number of check points improves the dependability of the measuring system but leads to a substantial increase in the work involved in the testing procedure. Furthermore, fixing a large number of thermocouples is associated with serious damage to the insulation of the steel sheets. Subjective methods of searching for heated points yield no controlled accuracy and preclude any quick action. The application of optical feelers is more promising, because these provide easier determination of the most heated points on the stator surface. However, the coordinates of these points must be determined through a number of labor-consuming and ineffective operations, including the determination and recording of these coordinates.

The foregoing practically rules out the application of such feelers for obtaining a sufficiently complete dynamic picture of a stator thermal field.

In the prior art, instruments are known for checking the inner surface of drill pipes, which comprise a panoramic-view television camera, lighting device and lifting-and-lowering mechanism. However, these instruments only produce a visual image, i.e. they reflect the geometric pattern and the state of the surface illuminated by the light device, but do not register the thermal radiation of that surface.

Also known in the art are instruments for examination and objective evaluation of the state of the thermal field on the surface of a tested object. Such instruments are referred to as thermovisors. Television equipment is also employed in solving a number of important problems, including medical tests, quality and operation control of electronic equipment and electric power units, power line checking, propulsion plant control, etc.

These instruments possess high technical accuracy. Their sensitivity, for example, is 0.2°C; discrimination, 4 angular minutes; field of view, 10° by 10°; frame rate, 16 frames per second; the thermal field of a tested object is projected on a cathode-ray tube as a black-and-white image.

However, the prior art types of thermovisors have no means for correlating images obtained to the coordinates of a tested object, which makes it impossible to use the obtained infrared chart for an accurate detection of a flaw. Although said instrument is provided with an angular orientation device, one has to use auxiliary instruments to find the coordinates of the instrument itself versus an object.

Additionally, the prior art thermovisors have no devices for automatic survey of the internal surface of a stator with a rated accuracy.

There is a current trend towards an increased unit power of generators, which is largely achieved due to a higher linear load on a generator, and only to a small extent at the expense of larger overall dimensions of a machine. This brings about higher electromagnetic loads, which, in turn, imposes more stringent requirements upon the quality of the active-steel stator packs.

It is an object of the present invention to obviate disadvantages inherent in the prior-art methods and apparatus.

Another object of the present invention is to provide a method for quality control of active-steel stator packs of electric machines which offers reliable and complete information on the state of the thermal field of the steel mass upon induction heating thereof in the course of testing for shorted sheets.

Still another object of the present invention is to provide a device for quality control of active-steel stator packs which makes it possible to rapidly obtain an objective picture of the distribution of temperatures over the inner surface of a stator with accurate coordinates of overheated areas.

The foregoing object are attained by providing a method for quality control of active-steel stator packs, for an electric machine, which comprises heating said active steel of a stator pack, introducing an infrared heat sensor into the bore of the stator and uniformly moving said infrared heat sensor along the stator axis. As a result, heat radiation along the entire periphery of the cross-section of the stator is registered at each point of the motion of said infrared heat sensor, which provides a continuous display of the entire inner surface of the stator. Overheated areas of the stator are detected by a signal from said infrared heat sensor.

The results of indicating thermal radiation over the entire inner surface of the stator can be obtained in the form of an infrared chart made to scale; the contrast areas of such charts indicate the coordinates and shape of the excess heating zones.

Furthermore, it is preferred that indication of the thermal radiation over the entire inner surface of the stator be performed repeatedly, and, as the contrast of the infrared charts varies, the depth and intensity of the heating zones can be detected.

The proposed method is easily applicable and allows the entire thermal field of the inner surface of a stator to be readily investigated, accurate coordinates and shape of heating zones to be determined, the dynamics of varied intensity and shaping of heating zones to be analyzed, and the effect of the production assembly processes upon non-uniform heating of the stator steel mass to be traced.

The proposed method for quality control of active-steel stator packs is realized by means of a thermovisor device for quality control of the active-steel stator packs, which comprises:

an optical head; a body supporting said optical head; an infrared objective for said optical head;

a scanning mirror placed behind said infrared objective; a case containing therein said infrared objective and said scanning mirror; a scanning drive which drive said case in rotation with respect to the tested inner surface of a stator; an electric motor and a reduction gear for said drive which also drives said infrared objective and said scanning mirror in rotation; a thermal radiation sensing head arranged in such a way that the thermal radiation from the tested surface of the stator is received by said infrared objective, then by said scanning mirror, and then by said sensing head; a power-fed carriage having at least two radial spur legs, each provided with at least two wheels; drive means for said wheels; said optical head being mounted on said power-fed carriage; an amplification unit with an input and an output, said thermal radiation sensing head having an output connected to said input of the amplification unit; a signal recorder with an input and an output, said amplification unit having an output connected to said input of the recorder, while the output of said recorder produces an infrared chart of the inner surface of the stator.

The present invention will be more fully understood from the following description of a device for quality control of active-steel stator packs, when read in conjunction with the accompanying drawings wherein.

Figure 1:
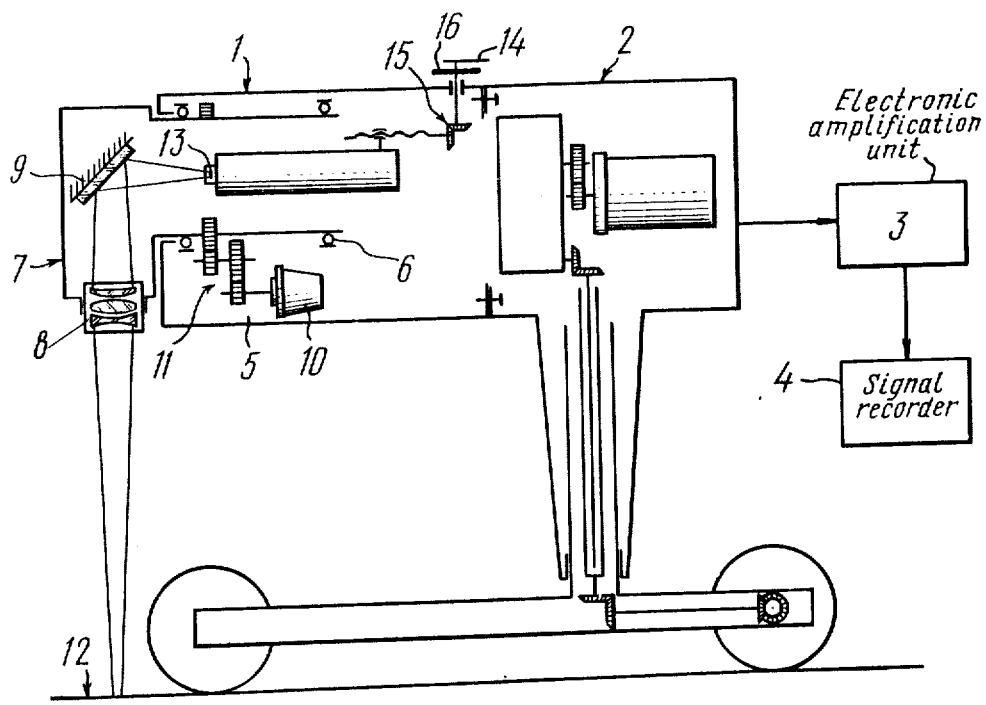
FIG. 1 is a schematically represented elenation view of a device for quality control of active-steel stator packs for an electric machine, in accordance with the invention.

The device for quality control of active-steel stator packs for electrical machines comprises an optical head 1 (FIG. 1) mounted on a power-fed carriage 2, and electronic amplification unit 3 and a recorder 4.

In a body 5 of the optical head 1, mounted on bearings 6 is a case 7 containing an infrared objective 8 and a scanning mirror 9 which is placed behind the infrared objective 8.

The case 7 is driven in rotation by a drive comprising a hysteresis induction motor 10 (with a power of 7 wt) and a reduction gear 11.

In this way, the infrared objective 8 and the scanning mirror 9 carry out an element-by-element circular examination of the inner surface 12 of a stator of an electric machine.

The hysteresis induction motor 10 and the reduction gear 11 ensure a uniform rate of the element-by-element circular examination of the inner surface 12 of the stator, which is equal to 2 r.p.s.

The infrared objective 8 and the scanning mirror 9 project the image of the elements of the inner surface 12 of the stator on a thermal radiation sensing head 13.

The thermal radiation sensing head 13 is mounted along the geometric axis of scanning and is capable of moving along the axis of the device within a span of 30 mm.

This makes it possible to check the inner surface of the stators of powerful electric machines from 1,100 to 3,000 mm in diameter.

The setting of the thermal radiation sensing head to a required position, i.e. for its focusing, is effected by a handle 14 through a focusing drive 15 according to a scale 16 which is calibrated with respect to the diameter of a stator.

The body 5 of the optical head 1 is mounted on the power-fed carriage 2.

Figures 2, 3:
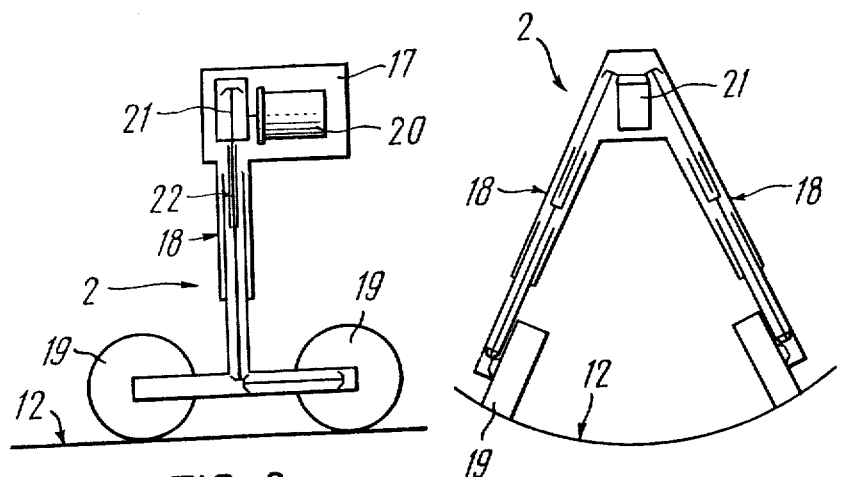
FIG. 2 illustrates the power-fed carriage of the device in side elevation.
FIG. 3 is a front view of the power-fed carriage of FIG. 2.

The power-fed carriage 2 (FIG. 2 and 3) comprises a case 17 mounted on two radial spur legs 18. Each of the radial spur legs 18 carries a pair of with running wheels 19 which are longitudinally offset along the generatrix of a stator.

Used as a guide for the motion of the power-fed carriage 2 is the inner cylindrical surface 12 of a stator which is a sequence of recesses and projections.

The width of the running wheel 19 is selected so that it spans the longitudinal grooves of a stator.

The power-fed carriage 2 has a drive comprising an electric motor 20, a reduction gear 21 and a transmission 22 which transmits rotation to the running wheels 19.

The running wheels 19 are provided with a tachometer (not shown).

The drive of the power-fed carriage 2 ensures a uniform rate of examination of the inner surface 12 of a stator, which is equal to 10 mm/sec.

To reduce the retraction time, the drive of the power-fed carriage can develop a reverse speed of 100 mm/sec. The power of the power-fed carriage drive approximates 80 W.

Figure 4:
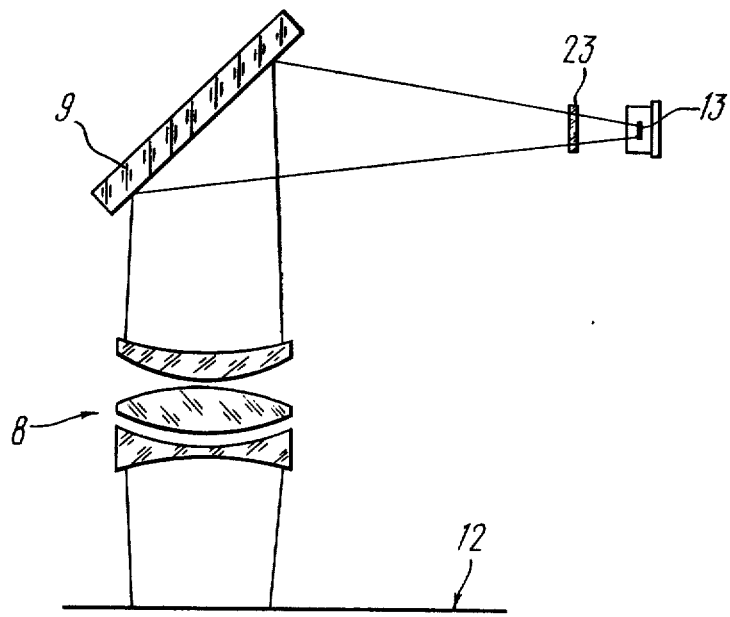
FIG. 4 is a diagrammatic illustration of an optical unit of the device.

The optical elements of the device include the infrared objective 8 (FIG. 4) with a diaphragm, the scanning mirrow 9, an interference light filter 23 and the thermal radiation sensing head 13.

The infrared objective 8 comprises a system of lenses which pass radiation within a range of wavelengths from $\lambda=3.6$ mu to $\lambda=4.8$ mu from an object at a distance from 500 to 700 mm.

In this case, thermal radiation from the elements of the inner surface of a heated stator is received by the infrared objective 8, and passed by the scanning mirror 9 at an angle of 45° to the optical axis, and to the interference light filter 23 and thence to the thermal radiation sensing head 13.

The thermal radiation sensing head 13 is a photoresistor with an area of sensitivity S=1 mm + 1 mm.

Figure 5:
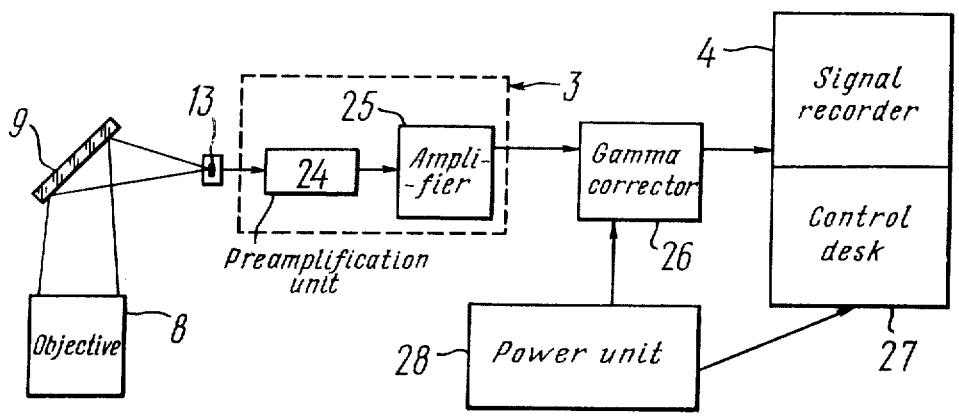
FIG. 5 is a schematic illustration of the device in accordance with the invention.

From the thermal radiation sensing head 13, the electrical signal is fed to a preamplification unit 24 (FIG. 5).

The preamplification unit 24 is placed in immediate proximity to the thermal radiation sensing head 13, in order to eliminate interference produced by any electric motors in proximity thereto where the assembly of electric machine stators takes place.

Therefore, the signal is fed via a junction cable to an amplifier 25 where it is amplified and filtered of low-frequency components of power currents.

The amplifier incorporates means for amplitude control of the output voltage.

From the amplifier 25, the signal is fed to the recorder 4 via a gamma corrector 26.

The gamma corrector 26 comprises active non-linear electric circuits which make it possible to adjust the input signal to the characteristic of the electrochemical paper on which the signal is recorded, so that the picture contrast is make dependent on the input signal.

The recorder 4 comprises a contact mechanism which consists of a single-threaded screw, set in motion by a synchronous motor, a large-pitch rack and a tape mechanism (not shown).

The drawing shows a supply unit 28.

the electrochemical paper is wound on a feed shaft of the recorder 4 and passes between the rack and the edge of the screw, after which it is received by pull rollers provided with a motor whose speed depends on the voltage supplied from the control desk 27, in order to ensure an even distribution of the recording over the paper's surface.

Presented hereinafter is a detailed description of the proposed method for quality control of active-steel stator packs.

Active-steel packs of a stator of an electric machine are subjected to induction heating, for which purpose an auxilary winding is wound around the core, which is then energized by alternating current. The magnitude of the current is selected with respect to the given magnetic induction in the steel and to the heating period.

Upon de-energizing the auxiliary winding, the device of the invention is inserted into the bore of the stator, and the scanning axis of the optical head 1 is aligned with the axis of the stator by means of the spur legs 18.

The control desk 27 actuates the scanning drive and that of the power-fed carriage.

The power-fed carriage 2 drives the optical head 1 in a uniform advance motion which anoids any elements of the surface 12 of the stator from being left out or overlapping each other.

A phasing unit is built in the drive for a rotation of the recording drum and matches the edges of the recording with a predetermined generatrix of the inner surface of the stator.

Due to the composition of two motions, the rotation (the scanning motion) and the rectilinear advance motion, the examination of the inner surface of the stator proceeds along the helicoidal line.

The scanning mirror carries out an element-by-element circular checking of the inner surface of the stator.

The thermal radiation of the elements of the surface 12 of the stator is focused by the infrared objective 8 upon the thermal radiation sensing head 13.

The electric signal of the thermal radiation sensing head 13 is amplified and applied to an electrode of the recorder 4.

The recorder 4 produces a half-tone image of the examined surface 12 of the stator in the form of infrared charts.

One revolution of the scanning mirror corresponds to one side of the recording on the infrared chart, which is due to the 100 per cent synchronism of the scanning drives and the recorder drives.

The major grid on the infrared chart is the image of the natural relief of the stator surface, i.e. a sequence of recessions and projections.

Accurate reference points are provided by the tachometer. The diameter of the running wheel 19 is so chosen to cover by each revolution 0.5 m of longitudinal travel. The tachometer sends a pulse to a multiple-thread screw-electrode arranged in the recorder 4.

Scanning and recording of the bore surface 12 are performed immediately after the cooling process begins and subsequently, after a period of 10–15 minutes, until the thermal field is practically uniform. The series of infrared charts thus obtained is analyzed according to the following indications:

a. coordinates of the brightest and the most intense heat zones;
b. characteristics of heat zone shapes (dotted, elongated along a slot, oriented along packs, etc.);
c. rate and nature of temporal variation of the relative brightness of heat zones;
d. actual temperature of the most important heat zones.

The results thus obtained are compared with those of tests performed at earlier stages of manufacture, and an assessment is made for conformity with the specification standards.

What is claimed is:

1. A method for examining annular active-steel stator packs for an electric machine comprising heating the active steel of a stator pack, introducing an infrared heat sensor and optical receiver into the bore of the stator pack, uniformly moving said infrared heat sensor and optical receiver along the axis of the stator pack while rotating the optical receiver within the stator pack so that heat radiation is received by the sensor from the entire inner periphery of the cross-section of the stator to provide a continuous examination of the entire inner surface of the stator, and recording the effect of heat radiation received by the sensor to determine the presence of overheated areas of the stator.

2. A method as claimed in claim 1 wherein the recording of the effect of radiation at the entire inner surface of the stator is obtained in the form of a chart made to scale, the contrast areas of the chart serving to determine the coordinates and shape of the overheated areas.

3. A method as claimed in claim 2 comprising measuring the heat radiation at the entire inner surface of the stator pack repeatedly, the depth and intensity of overheated areas being determined through contrast variation of said chart.

4. A method as claimed in claim 1 wherein the heat sensor is moved within the stator pack by mounting the sensor on a carriage which is longitudinally displaced along the axis of the stator pack while the optical receiver is continuously rotated on said carriage around the axis of the stator pack.

5. Apparatus for examining the interior surfaces of annular stator packs for electrical machines, said apparatus comprising a carriage including means for displacement of the carriage longitudinally within the interior of an annular stator pack, a rotatable casing supported by said carriage, an infrared radiation sensing head fixably mounted on said carriage, optical means carried by said casing and positioned for transmitting thermal radiation from the interior surface of the annular stator pack to said sensing head, means for driving said casing in rotation so that as the carriage is longitudinally displaced in the stator pack and the casing is driven in rotation the entire inner periphery of the annular stator pack is continuously scanned and its temperature measured, and recording means coupled to said sensing head for providing a correlated record of the thermal radiation received by the sensing head.

6. Apparatus as claimed in claim 5 wherein said optical means comprises an objective, and a scanning mirror carried by said casing and positioned to transmit heat energy to said sensing head.

7. Apparatus as claimed in claim 6 comprising means for adjusting the relative position of said sensing head and the mirror to effect focussing.

8. Apparatus as claimed in claim 5 wherein said carriage includes at least two radial spur legs each including two longitudinally spaced wheels.

9. Apparatus as claimed in claim 8 wherein said two spur legs are so angled that the wheels thereon ride along respective spaced generatix lines of the inner surface of the stator pack.

10. Apparatus as claimed in claim 5 wherein said recording means comprises amplification means connected to said sensing head, and a signal recorder connected to said amplification means.

* * * * *